US012637368B2

(12) United States Patent
Al Mezayen et al.

(10) Patent No.: US 12,637,368 B2
(45) Date of Patent: May 26, 2026

(54) WATER TREATMENT UNIT COMPRISING A PLURALITY OF FILTRATION DEVICES

(71) Applicant: INOVAYA, Lyons (FR)

(72) Inventors: Khaled-Valentin Al Mezayen, Lyons (FR); Sylvain Masson, Villeurbanne (FR)

(73) Assignee: INOVAYA, Lyons (FR)

( * ) Notice: Subject to any disclaimer, the term of this patent is extended or adjusted under 35 U.S.C. 154(b) by 362 days.

(21) Appl. No.: 18/274,380

(22) PCT Filed: Feb. 10, 2022

(86) PCT No.: PCT/EP2022/053197
§ 371 (c)(1),
(2) Date: Jul. 26, 2023

(87) PCT Pub. No.: WO2022/171718
PCT Pub. Date: Aug. 18, 2022

(65) Prior Publication Data
US 2024/0308884 A1 Sep. 19, 2024

(30) Foreign Application Priority Data

Feb. 10, 2021 (FR) ..................................... 2101269

(51) Int. Cl.
*C02F 9/00* (2023.01)
*B01D 36/02* (2006.01)
(Continued)

(52) U.S. Cl.
CPC .............. *C02F 1/444* (2013.01); *B01D 36/02* (2013.01); *B01D 39/2031* (2013.01);
(Continued)

(58) Field of Classification Search
CPC ........... C02F 1/444; C02F 1/001; C02F 9/00; C02F 2301/08; C02F 1/281; C02F 1/283;
(Continued)

(56) References Cited

U.S. PATENT DOCUMENTS

| | | | |
|---|---|---|---|
| 4,888,114 A | 12/1989 | Gaddis et al. | |
| 6,416,668 B1* | 7/2002 | Al-Samadi | B01D 61/025 210/639 |
| 2004/0144728 A1 | 7/2004 | Moller et al. | |
| 2005/0103721 A1* | 5/2005 | Fritze | C02F 9/20 210/744 |

(Continued)

FOREIGN PATENT DOCUMENTS

| | | |
|---|---|---|
| DE | 29823757 U1 | 10/1999 |
| DE | 102017011936 A1 | 6/2019 |

(Continued)

OTHER PUBLICATIONS

English translation of JP_H11207392A, Aug. 3, 1999. (Year: 1999).*

*Primary Examiner* — Joseph W Drodge
(74) *Attorney, Agent, or Firm* — Thompson Coburn LLP; Steven M. Ritchey

(57) ABSTRACT

The water treatment unit (2) comprises at least one series of four filtration systems including a first filtration system (28), with activated mineral particles, a second filtration system (44), with ultrafiltration membrane, a third filtration system (52), with filter media, and a fourth filtration system (58), with ultrafiltration membrane (48). The first, second, third and fourth filtration systems (28, 44, 52, 58) are arranged in series, in said order, on a flow path (C) of the water being treated in the water treatment unit (2).

11 Claims, 4 Drawing Sheets

(51) Int. Cl.

| | |
|---|---|
| *B01D 39/20* | (2006.01) |
| *B01D 61/14* | (2006.01) |
| *B01D 61/16* | (2006.01) |
| *C02F 1/00* | (2023.01) |
| *C02F 1/44* | (2023.01) |

(52) U.S. Cl.
CPC ........... *B01D 61/145* (2013.01); *B01D 61/16* (2013.01); *C02F 1/001* (2013.01); *C02F 9/00* (2013.01); *B01D 2311/2649* (2013.01); *C02F 2301/08* (2013.01)

(58) Field of Classification Search
CPC ................ C02F 1/288; C02F 2209/005; C02F 2209/40; C02F 2303/16; B01D 61/146; B01D 2311/04; B01D 65/02; B01D 2311/2626; B01D 2311/2649; B01D 2317/02; B01D 2321/04; B01D 36/02; B01D 39/2031; B01D 39/2034; B01D 39/2037; B01D 39/2055; B01D 39/2058; B01D 61/14; B01D 61/145; B01D 61/16; B01D 61/20; B01D 2311/16; B01J 20/18; B01J 20/20; B01J 20/34; B01J 20/3416; B01J 20/3433
See application file for complete search history.

(56) References Cited

U.S. PATENT DOCUMENTS

| | | | | |
|---|---|---|---|---|
| 2010/0292844 | A1* | 11/2010 | Wolf ......................... | C02F 9/00 |
| | | | | 700/271 |
| 2011/0139715 | A1* | 6/2011 | Zha ......................... | B01D 65/02 |
| | | | | 210/636 |
| 2014/0131281 | A1* | 5/2014 | Morikawa ............. | B01D 61/04 |
| | | | | 210/257.2 |
| 2019/0023587 | A1 | 1/2019 | Noles | |
| 2020/0133183 | A1* | 4/2020 | Makino ............. | G03G 15/6538 |
| 2024/0082788 | A1* | 3/2024 | Al Mezayen .......... | B01D 63/02 |

FOREIGN PATENT DOCUMENTS

| | | | | | | |
|---|---|---|---|---|---|---|
| EP | 0470427 | A1 | * | 2/1992 | ............. | B01J 20/20 |
| EP | 2926888 | A1 | | 10/2015 | | |
| GB | 2413124 | A | * | 10/2005 | ............. | C02F 1/725 |
| JP | H10192850 | A | | 7/1998 | | |
| JP | H11207392 | A1 | * | 8/1999 | ............... | C02F 9/00 |
| JP | 2008289959 | A | | 12/2008 | | |
| WO | WO-0154786 | A2 | * | 8/2001 | ........ | B01J 20/28052 |
| WO | 02076590 | A2 | | 10/2002 | | |
| WO | 2008047393 | A1 | | 4/2008 | | |
| WO | 2014152176 | A2 | | 9/2014 | | |
| WO | 2020030943 | A1 | | 2/2020 | | |

* cited by examiner

1

WATER TREATMENT UNIT COMPRISING A PLURALITY OF FILTRATION DEVICES

CROSS-REFERENCE TO RELATED APPLICATIONS

This application is a U.S. National Phase application of PCT/EP2022/053197 filed on Feb. 10, 2022, claiming the benefit of French Application No. 2101269, filed on Feb. 10, 2021, both of which are incorporated herein by reference in their entireties.

The present invention relates to a water treatment unit comprising a plurality of filtration systems for clarifying, disinfecting and reducing pollutants in the water, in particular micropollutants, such as endocrine disruptors, pesticide derivatives, herbicides. Such a unit can more particularly be used for making surface fresh water drinkable, as per the standards of a Regional Health Agency in France.

In the field of water treatment, it is known how to arrange different filters on the path of a flow of water to be treated, in order to improve the quality of the water. The different filters can include filters operating according to an essentially mechanical principle, which define water passage orifices, and filters which operate by adsorption of certain pollutants.

WO-A-2008/047393 thus discloses a drinking water treatment apparatus wherein an activated carbon filter is integrated into a first filtration unit, which is arranged upstream of a second filtration unit which is preferentially of the ultrafiltration type. Such approach combines the advantages of adsorption filtration and fine mechanical filtration, by ultrafiltration. Such equipment is equipped with a plurality of non-return valves which prevent a circulation in the opposite direction, and hence a backwash of the filters. Furthermore, the activated carbon filter receives a flow of water which can be heavily loaded with clogging agents or pollutants because same is arranged upstream of the ultrafiltration unit, even if same is arranged downstream of a mechanical filter integrated into the first filtration unit, the pore size of which is greater than or equal to 20 micrometers ($\mu$m).

Other approaches are described in WO-A-2020/030943 or WO-A-02/76590, without considering backwash possibilities or the protection of an activated carbon filter with respect to certain clogging agents and certain pollutants.

It is also known from WO-A-2014/152176 how to arrange a reverse osmosis filter as the final subsystem of a series of filters, which includes a mixed media filtration subsystem, which is not an activated media filter, as well as membrane and activated carbon filtration subsystems. In the backwash configuration, the reverse osmosis filter is short-circuited. The osmosis filter does not protect the activated carbon subsystem against back contamination.

Such drawbacks are the drawbacks that the invention more particularly intends to overcome by proposing a new water treatment unit for improving the service life of the filtration systems included therein, in particular due to backwashing.

To this end, the invention relates to a unit for clarification, disinfection and reduction of pollutants for water treatment, characterized in that same comprises at least one series of four filtration systems including:

a first filtration system, with activated mineral particles;
a second filtration system, with ultrafiltration membrane;
a third filtration system, with filter media;
a fourth filtration system, with ultrafiltration membrane;

The first, second, third and fourth filtration systems are arranged in series, in said order, on a flow path of the water being treated in the water treatment unit.

By means of the invention, the series of four filtration systems can be used for efficiently treating a quantity of water, e.g. aiming at making same drinkable, while ensuring that the filtration systems operate in a sustainable way, over time, in particular since the filter media filtration system is protected against clogging agents and pollutants, on the upstream side thereof and on the downstream side thereof, by the two filtration system with ultrafiltration membranes. A filtering medium, as defined by the present invention, can be an adsorbent medium, such as granular activated carbon or granular zeolite, or a medium consisting of metal particles covered with a layer of metal oxide.

According to advantageous but non-mandatory aspects of the invention, such a water treatment unit can incorporate one or a plurality of the following features, taken individually or according to any technically permissible combination:

The cumulative surface area of the ultrafiltration membranes of the second filtration system is greater than the cumulative surface area of the ultrafiltration membranes of the fourth filtration system.

Each filtration system with ultrafiltration membrane is formed by identical ultrafiltration modules and in that the number of ultrafiltration modules of the second filtration system is greater than the number of ultrafiltration modules of the fourth filtration system.

The third filtration system with filtering media is a filtration system with adsorbent media, in particular with activated carbon or with zeolite.

The third filtration system with filter media is a filtration system made of metal granules covered with a layer of metal oxide.

The unit comprises a fifth filtration system, of the mechanical effect filter type, arranged upstream of the series of four filtration systems.

The unit comprises an individualized backwash subassembly of the second and fourth filtration systems and, where the unit comprises a fifth filtration system, of the mechanical effect filter type, arranged upstream of the series of four filtration systems, for the combined backwash of the first and fifth filtration systems.

The backwash subassembly includes:

a booster pump for feeding clean water;

a first backwash circuit connecting the booster pump outlet to a first point in the flow circuit, situated between the first and second filtration systems;

a second backwash circuit connecting the outlet of the booster pump to a second point of the flow circuit situated between the second and third filtration systems and to a third point of the flow circuit, situated downstream of the fourth filtration system;

a first controlled valve which controls the flow of clean water in the first backwash circuit;

a second pilot-operated valve and a third pilot-operated valve which control the flow of clean water in a branch of the second backwash circuit connected to the second point of the flow circuit;

a fourth pilot-controlled shut-off valve for the flow circuit downstream of the fourth filtration system;

a fifth pilot-controlled shut-off valve for the flow circuit between the third and fourth filtration systems; and drainpipes locally connecting the flow circuit or one of the filtration systems to a collecting pipe, the drain circuits being equipped with pilot-controlled shut-off valves.

The part of the flow circuit between the first and second filtration systems comprises a section equipped with recovery zones for solid particles present in the water being treated, whereas, preferentially the cross-section of said section is widened with respect to the cross-section of the rest of the flow circuit.

The unit comprises a first meter for measuring the quantity of water circulating in the flow circuit, the first meter being installed in the flow circuit upstream of the first filtration system, and a second meter for measuring the quantity of water circulating in the flow circuit, the second meter being installed in the flow circuit downstream of the fourth filtration system.

The invention will be better understood and other advantages thereof will appear more clearly in the light of the following description of an embodiment of a water treatment unit according to the principle thereof, given only as an example and made with reference to the enclosed drawings, wherein.

Figure 1:
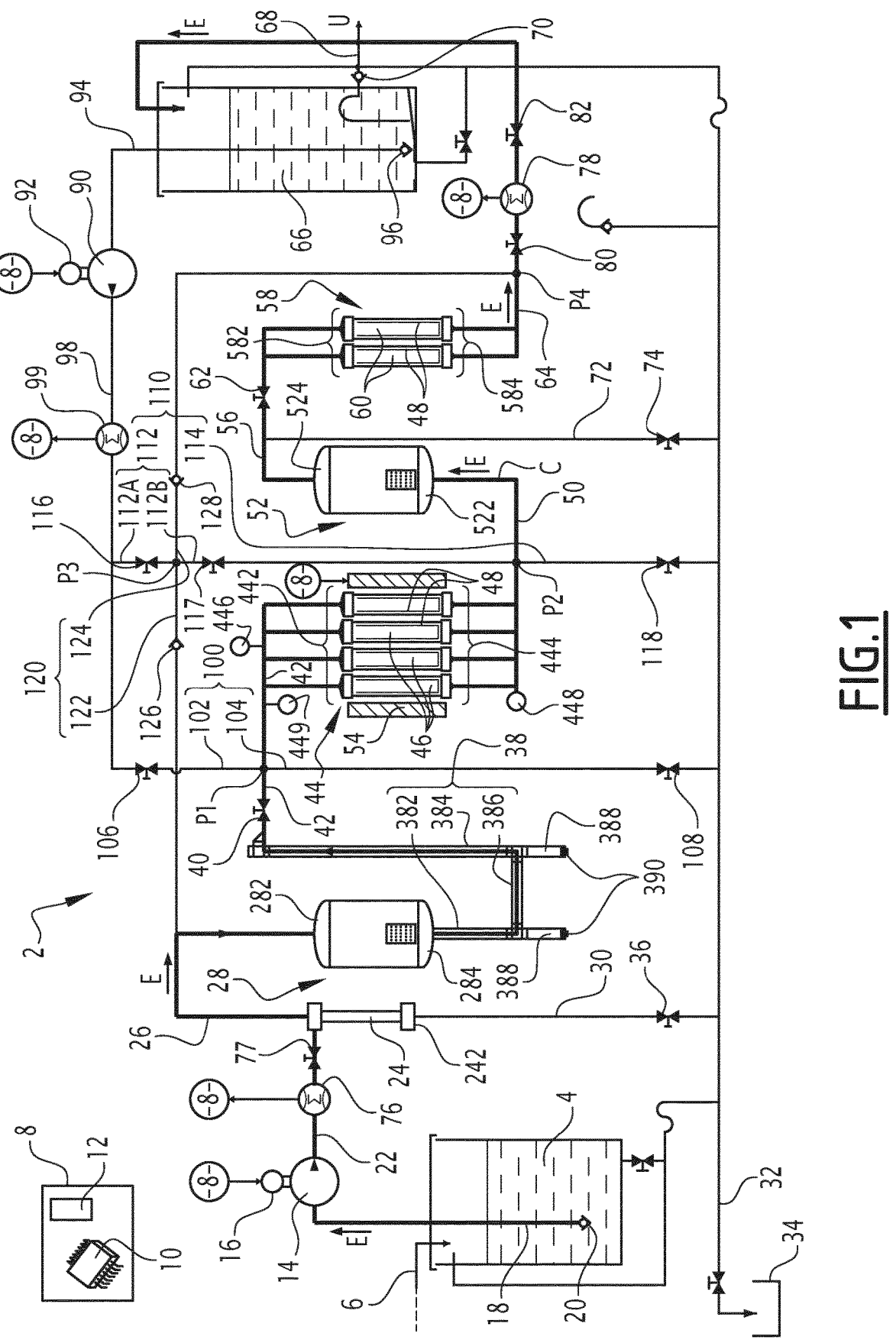
FIG. 1 is a block diagram of a water treatment unit according to the invention, in operation for the treatment of a quantity of water.

The unit 2 shown in FIGS. 1 to 4 is used for pollutant clarification, disinfection and reduction in a quantity of water present in a tank 4 which belongs to the unit 2 and which is supplied with water to be treated via a pipe 6.

The treatment unit 2 further comprises a control board 8 which includes at least one microprocessor 10 and a memory 12 wherein is stored a program for controlling in operation the treatment unit 2. The control board 8 is connected to different members, such as meters or solenoid valves of the treatment unit 2 by links (not shown), which can be either wired or non-wired links. In the figures, dashed arrows having as origin or as destination the reference 8 surrounded by a circle show the transmission of information between certain members of the treatment unit 2, other than solenoid valves, and the control board 8. The control board also controls the various solenoid valves of the treatment unit, which are mentioned below, by means of wired or non-wired connections (not shown). The control board also receives the output signals from the pressure and temperature sensors mentioned hereinafter.

In FIGS. 1 to 4, the arrows E represent the direction of flow of the water in the pipes of the treatment unit 2.

In the present description, the inlet and outlet of a component of the treatment unit 2 are defined according to the normal direction of flow of water in said unit, as the part through which water enters or exits the component, when a flow of water is being treated within the unit.

The treatment unit 2 comprises a main pump 14 driven by an electric motor 16 controlled by the control board 8. An intake tubing 18 connected to the inlet of the main pump 14 plunges into the tank 4 and is equipped, at the upstream end, with a non-return valve 20.

The delivery outlet of the main pump 14 is connected by a pipe 22 to the inlet of a filtration system 24 with mechanical effect, e.g. a cyclone filter. The outlet of the mechanical effect filter 24 is connected by a pipe 26 to the inlet 282 of a filtration system 28 with activated mineral particles.

On the other hand, a drainpipe 30 connects a drain outlet 242 of the mechanical effect filter 24 to a collecting pipe 32 of water loaded with clogging agents and pollutants, which discharges into a tank 34 for collecting charged water.

A solenoid valve 36, controlled by the control board 8, is arranged on the drainpipe 30.

The filtration system 28 contains an activated mineral particle filter formed by glass grains the size of which is comprised between 0.4 and 1 mm and the surface state of which is modified, in the sense that the glass grains can be qualified as "activated". Such a filter is sold e.g. by the company Bayrol under the trademark AFM. The activation of the surface state of the glass grains induces an increase in the porosity thereof.

The fact that the filtering medium of the filtering system 28 is formed of grains means that the surface area of contact of the filtering medium with the water is relatively large, while imparting good compactness to the system. Furthermore, such type of filtering medium is compatible with a backwash, which would not necessarily be the case with a filtering medium having particles with a size less than 0.4 mm which could cause mineral particles to leak into the system.

The outlet 284 of the filtration system 28 is connected to a pipe 38 the diameter of which is greater than the diameter of the pipe 26 e.g. 1.5 times greater. Thereby, the cross-section of the water flow through the pipe 38 is widened with respect to the section of the pipes which are situated upstream and downstream. The pipe 38 is generally U-shaped, with two vertical branches 382 and 384 and a horizontal branch 386. The foot of each horizontal branch 382 and 384 is connected to a dead leg 388 equipped with a removable plug 390. Given the relatively large diameter thereof, the pipe 38 forms a zone for calming the flow of water at the outlet of the filtration system 28, which would allow solid particles which would be released into the water by the filter 28, to fall into the dead legs 190 where same can accumulate. In particular, activated mineral particles of the filtration system 28 are thereby prevented from abrading the membranes of the filters arranged downstream. It is also in this way possible to recover, by decanting, solid particles of clogging agents or of pollutant present in the water downstream of the filtration system 28.

During an operation of the treatment unit 2, and when all the pumps are stopped, it is possible to remove the removable plugs 390 for purging the dead legs 388 and recovering the solid particles which have accumulated therein.

When water circulates through the filtration system 28, a filter cake forms on the quantity of filter media consisting of the activated glass grains. The filter cake participates in the filtration exerted by the filtration system 28.

A solenoid valve 40 is arranged at the downstream end of the pipe 38. A pipe 42 connects the solenoid valve 40 to the inlet 442 of an ultrafiltration system 44 which comprises four ultrafiltration modules 46, each of the ultrafiltration modules comprising one or a plurality of ultrafiltration membranes 48, preferentially hollow fiber ultrafiltration membranes.

An ultrafiltration system, as defined by the present invention, is a filtration system designed for retaining particles the largest dimension of which is greater than or equal to 1 micrometer (µm). Herein, the ultrafiltration membranes 48 define pores for the passage of water, the largest average dimension of which is comprised between 0.01 μm and 1 μm, preferentially between 0.01 μm and 0.03 μm. The cut-off threshold of an ultrafiltration membrane is a particle size beyond which 90% of the particles are retained by the membrane. Experience shows that the cut-off threshold is generally on the order of 10% of the largest average pore size. Thereby, for pores with a larger average size equal to 1 μm, the cut-off threshold is about 0.1 μm.

The ultrafiltration modules 46, and thus the membranes 48 thereof, are preferentially identical. The ultrafiltration modules 46 extend in parallel between the inlet 442 and the outlet 444 of the ultrafiltration system 44. However, other arrangements of the ultrafiltration modules 46 are possible.

The ultrafiltration membranes 48 are e.g. made of poly (sulfone) (PSU), Kynar® type poly(vinylidene fluoride) (PVDF), of NEOPHIL® type modified PVDF or of a mixture of the first two materials mentioned.

A heating system 54 is arranged at the filtration system 44 and is used for raising the temperature of the water in contact with the ultrafiltration membranes 48. The heating system 54 is used, in particular, for preventing the water from freezing in the ultrafiltration system 44 when the operation of the treatment unit 2 stops.

The heating system comprises electrical resistors which are in thermal contact with a body of each module 46, which contains one or a plurality of ultrafiltration membranes 48 and are used for heating the water contained therein.

A pipe 50 connects the outlet 444 of the filtration system 44 to the inlet 522 of an activated carbon filtration system 52. The activated carbon is an adsorbent filter medium of the filtration system 52, apt in particular to remove micropollutants present in the water, whether organic or inorganic, such as certain dissolved metals. More particularly, an adsorbent media filter based on activated carbon is used for retaining micropollutants dissolved in the water to be treated, such as residues of pesticides, herbicides or drugs, or endocrine disruptors, and to make the water taste-neutral and odor-neutral.

On the other hand, a first pressure sensor 446 is arranged at the inlet of the filtration system 44 and is used for knowing the pressure of the water entering the filtration system, while a second first pressure sensor 448 is arranged at the outlet of the filtration system 44 and is used for knowing the pressure of the water coming out of the filtration system. The difference in the pressures measured by the sensors 446 and 448, respectively, is representative of the head loss in the filtration system 44.

A temperature sensor 449 is installed on the pipe 42 and is used for knowing the temperature of the water at the inlet of the filtration system 44.

A pipe 56 connects the outlet 524 of the activated carbon filtration system 52 to the inlet 582 of an ultrafiltration system 58 which comprises two ultrafiltration modules 60, which are preferentially identical to each other and to the ultrafiltration modules 46, and which each comprise an ultrafiltration membrane 48.

A solenoid valve 62 is arranged on the pipe 56, hence between the outlet 524 of the activated carbon filtration system 52 and the inlet 582 of the ultrafiltration system.

The outlet 584 of the ultrafiltration system 58 is connected by a pipe 64 to a tank 66 for collecting the treated water. The reservoir 66 is connected as such to a user U by a pipe 68 equipped with a non-return valve 70 and which plunges into the reservoir 66.

The tubing 18, the pipes 22, 26, 38, 42, 50. 56 and 64, as well as the filtration systems 24, 28, 44, 52 and 58 together define a flow circuit C for the water being treated in the unit 2.

A drainpipe 72 connects the pipe 56 upstream of the solenoid valve 62 to the collecting pipe 32. A solenoid valve 74 is placed on the pipe 72.

A first meter 76 is arranged on the pipe 22 between the main pump 14 and the mechanical effect filter 24.

A solenoid valve 77 is arranged on the pipe 22 between the meter 76 and the mechanical effect filter 24.

A second meter 78 is arranged in the pipe 64 between the outlet 584 of the ultrafiltration system 58 and the tank 66. A solenoid valve 80 is arranged upstream of the meter 78, on the pipe 64. A manual valve 82 is arranged downstream of the meter 78, on the pipe 94.

The comparison of the signals transmitted by the meters 76 and 78, respectively, of to the control board 8 enables the microprocessor 10 to detect a leak, if any, in the flow circuit C.

On the other hand, the treatment unit 2 is equipped with a backwash subassembly which comprises a backwash pump 90 driven by an electric motor 92 controlled by the control board 8. An intake tubing 94 of the backwash pump 90 plunges into the tank 6 and is equipped, at the upstream end thereof, with a non-return valve 96.

The delivery outlet of the backwash pump 90 is connected by a pipe 98 to two branches 100 and 110 which extend in parallel between the pipe 98 and the collecting pipe 32. The pump 90 is thus a booster pump for feeding in ultrafiltered clean water, in other words water treated by the installation 2, of the pipe 98.

A meter 99 is installed on the pipe 98 and is used for notifying the control board 8 how much treated water is used to perform each backwash operation.

The branch 100 comprises a first section 102 which connects the pipe 98 to a point P1 of the pipe 42 situated between the solenoid valve 40 and the upstream side 442 of the filtration system 44. The second section 104 of the branch 100 connects the point P1 to the collecting pipe 32. Two solenoid valves 106 and 108 are arranged on the sections 102 and 104, respectively.

The branch 110 comprises a first section 112 which connects the pipe 98 to a point P2 of the flow circuit C situated on the pipe 50, between the outlet 444 of the ultrafiltration system 44 and the inlet 522 of the activated carbon filtration system 52. The section 112 is divided into a first arm 112A which connects the pipe 98 to a point P3 and a second arm 112B which connects the point P3 and the point P2. Three solenoid valves 116, 117 and 118 are arranged on the arms 112A and 112B and on the section 114, respectively.

The point P3 connects the section 112 to a pipe 120 which connects the pipe 26, upstream of the inlet 282 of the filtration system 28, to the pipe 64, downstream of the outlet 584 of the ultrafiltration system 58. The point P3 divides the pipe 120 into two sections 122 and 124, each equipped with a non-return valve 126, 128 respectively which lets the flow through when moving away from the point P3 and blocks the flow in the opposite direction.

The section 122 connects the pipe 26 to the point P3. The section 124 connects the point P3 to a point P4 of the flow circuit C located on the pipe 64, upstream of the solenoid valve 80.

The pipes 98, 100, 110 and 120 and the valves fitted thereto also belong to the backwash subassembly of the treatment unit 2.

In FIG. 1, the pipes of the circuit C for the flow of the water during treatment in the unit 2 are shown in thick lines, since same is the part of the treatment unit 2 wherein the water circulates, from the tank 4 to the tank 66.

During such circulation, the water is cleared of the particles and pollutants contained therein by successively passing through the filtration systems 24, 28, 44, 52 and 58.

The filtration system 24 is used for carrying out a relatively coarse filtration, which prevents clogging agents and pollutants of large size, typically greater than 150 μm, from flowing into the filtration system 28 which same could then rapidly clog.

The filtration system 28 is used, due to the mechanical effect of the activated mineral particles and of the cake present in the bed of particles, for clearing the flow of clogging agents and relatively fine pollutants, typically with a maximum dimension on the order of 4 μm.

The calming zone formed by the pipe 38 protects the ultrafiltration membranes 48 from any release of mineral particles from the filter 28 which could cause abrasion and a reduction in the service life of the ultrafiltration membranes 48.

The water then reaches the ultrafiltration system 44 where the ultrafiltration membranes 48 retain the plugging agents and pollutants of a size greater than the cut-off threshold of the membranes 48, i.e. between 0.01 μm and 0.1 μm.

The water which reaches the activated carbon filtration system 52 is thus cleared of a large part of the clogging agents and pollutants thereof, which prevents a rapid clogging of the activated carbon filter.

Thereby, the filtration systems 24 and 28 protect the ultrafiltration system 44 against rapid clogging and the filtration systems 24, 28 and 44 protect the filtration system 52 against rapid clogging.

In the normal configuration of water treatment in the flow circuit C, the second ultrafiltration system 58 has a safety function since same blocks, by means of the membranes 48 thereof, particles which could have passed into the upstream filtration systems, namely the filtration systems 24, 28, 44 and 52. The safety function is particularly important in the event of rupture of one of the ultrafiltration membranes 48 of the first ultrafiltration system 44.

The number of ultrafiltration modules 46 is higher than the number of ultrafiltration modules 60. Indeed, under normal conditions of use of the treatment unit 2, it is mainly the ultrafiltration system 44 which performs the ultrafiltration function. Thereby, even if the number of ultrafiltration modules 60 is smaller than the number of the ultrafiltration modules 46, the cumulative surface area of the ultrafiltration membranes 48 of the second ultrafiltration system 58 is sufficient for filtering the water coming out of the filtration system 52, because said water has already undergone an ultrafiltration operation within the first ultrafiltration system 44. In other words, the water downstream of the filtration systems 44 and 52 is less likely to clog the ultrafiltration membranes 48 of the second filtration system 58, than is the water at the outlet of the filtration system 28 likely to clog the ultrafiltration membranes 48 of the first ultrafiltration system 44. For the above reason, the cumulative surface area of the ultrafiltration membranes 48 of the second filtration system 58 can be smaller than the cumulative surface area of the ultrafiltration membranes 48 of the ultrafiltration system 44.

The different solenoid valves of the treatment unit 2 are controlled by the control board 8. In the configuration shown in FIG. 1, the solenoid valves 77, 40, 62 and 80 are controlled in the open position by the control board 8, while the other solenoid valves are controlled in the closed configuration. The non-return valves 126 and 128 prevent a short-circuit water flow, in parallel with the circuit C, between the points P1 and P3, and a water flow from the flow circuit C to branch 110.

As the treatment unit 2 progressively operates, the different filtration systems tend to become clogged.

For the above reason, the treatment unit 2 is configured for allowing backwash steps of some of the filtration systems thereof.

Backwashing of a filtration system can take place at predetermined times, e.g. every 1 hour of use of the unit 2, or taking into account the actual fouling of one or a plurality of the filtration systems, where the fouling can be determined for each filtration system by measuring the head loss therein, e.g. by means of pressure sensors.

During a backwash step, the operation of the main pump 14 is stopped and the backwash pump 90 is activated.

When it is necessary to backwash the filtration systems 24 and 28, the solenoid valves 106, 40 and 36 are controlled in the open position by the control board 8, while the other solenoid valves are controlled in the closed position.

In such case, the water drawn from the tank 66 by the recirculation pump 90 circulates in the tubing 94, in the pipe 98, in the section 102 of the branch 100, as far as the point P1, in the pipes 42 and 38, through the filtration system 28, in the opposite direction to normal operation, i.e. from the outlet 284 thereof to the inlet 282 thereof, in the pipe 26, through the filtration system 24, up to the drain outlet 242 thereof, and in the pipe 30, until reaching the collecting pipe 32.

Figure 2:
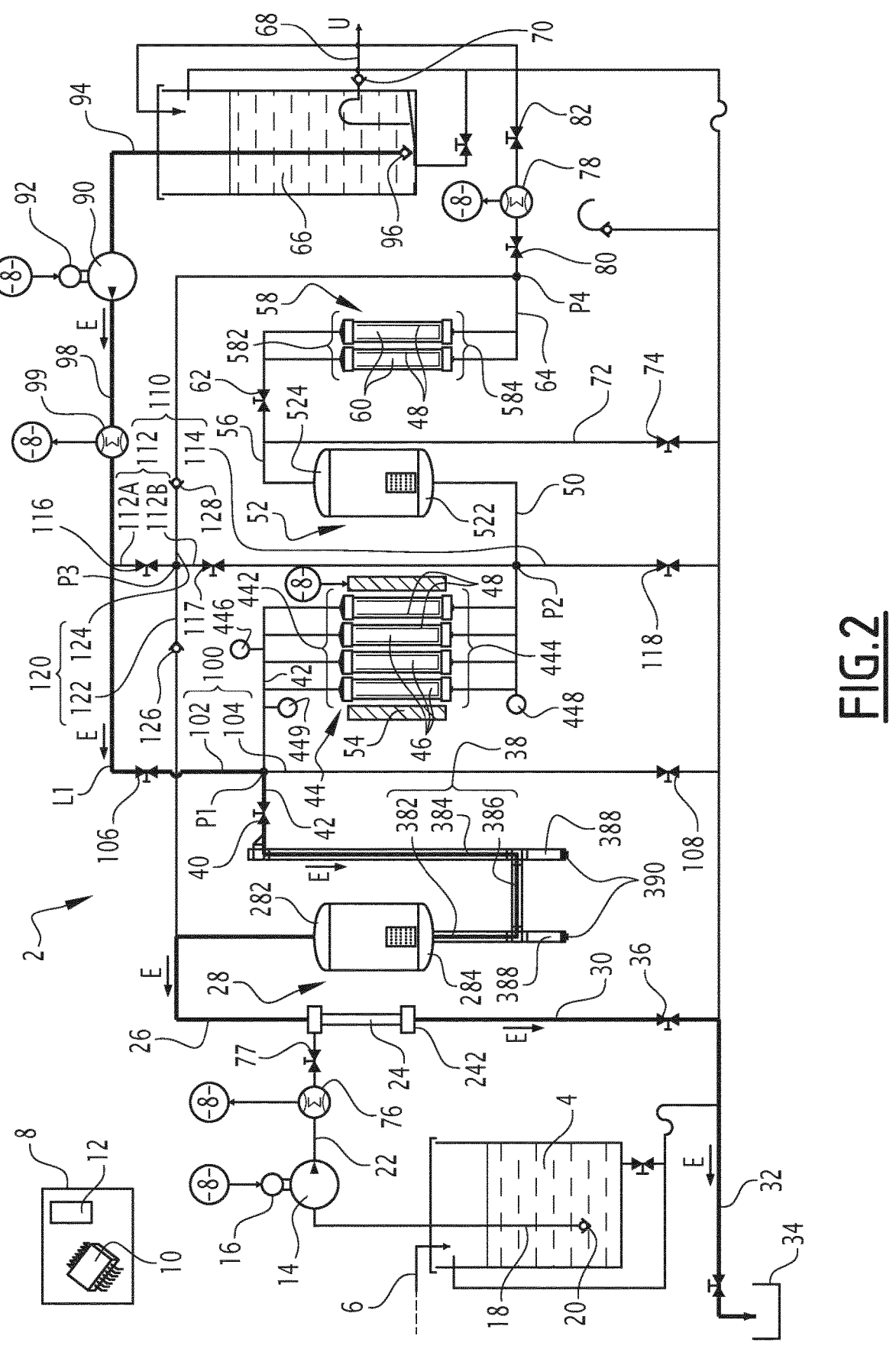
FIG. 2 is the same diagram as in FIG. 1, during a backwash of a first filtration system of the water treatment unit.

Such backwash step is represented in FIG. 2 where the pipes wherein the water actually circulates, together form a first backwash line L1 identified by thick lines.

Since the backwashing is carried out with treated water drawn from the tank 66, the risks of contamination of the filtration systems 24 and 28 are largely eliminated. The above also applies in the other backwash configurations mentioned hereinafter.

The duration of the backwash of the filtration systems 24 and 28 can be between 15 seconds (s) and 8 minutes (min), preferentially between 30 s and 2 min. In practice, a backwash of the filtration systems 24 and 28 can be provided if the head loss between the inlet 282 and the outlet 284 of the filtration system 28 is greater than a first threshold value V1, e.g. equal to 2 bar. The head loss is measured by pressure sensors (not shown) known per se.

When it is necessary to backwash the filtration system 44, the backwash pump 90 is activated and the solenoid valves 116, 117 and 108 are controlled in the open position by the control board 8, while the other solenoid valves are controlled in the closed position.

In this way it is possible to circulate water coming from the tank 66 in the tubing 94, in the pipe 98, in the branch 112 of the pipe 110 as far as the point P2, in the pipe 50, through the filtration system 44 in the opposite direction, from the outlet 444 to the inlet 442 thereof, in the line 42 to point P1. Since the solenoid valve 40 is closed, the backwash water can then flow only in the section 104 of the pipe 100 to the collecting pipe 32, then to the tank 34.

Figure 3:
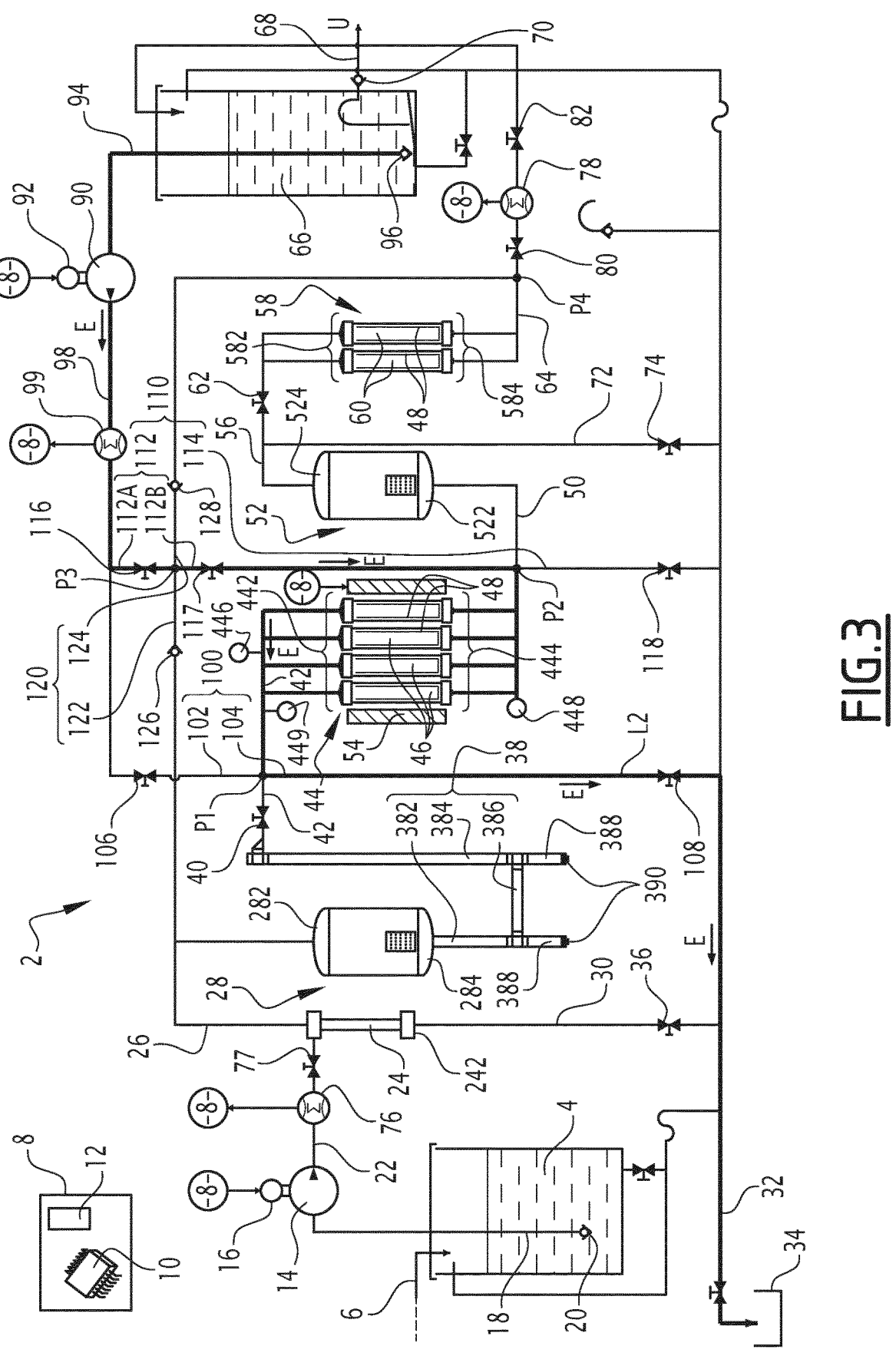
FIG. 3 is the same diagram as in FIG. 1, during a backwash of a second filtration system of the water treatment unit.

Such backwashing step is represented in FIG. 3 where the pipes wherein the water actually circulates, together form a second backwash line L2 identified by thick lines.

When it is necessary to backwash the filtration system 58, the backwash pump 90 is activated and the solenoid valves 116, 62 and 74 are switched to the open position by the control board 8, while the other solenoid valves are maintained in the closed position.

In this way it is possible to circulate the water taken from the tank 66 in the tubing 94, in the pipe 98, in the arm 112A as far as the point P3, in the branch 124, from the point P3 to point P4, in the pipe 64, in the filtration system 58, in the opposite direction, from the outlet 584 thereof to the inlet 582 thereof, in the pipes 62 and 72, as far as the collecting pipe 32. Downstream of the solenoid valve 62 with regard to the direction of flow of the water in said configuration, the backwash water does not backflows through the pipe 56 towards the outlet 524 of the filtration system 52, because the valves 40, 106, 108 are closed, 117 and 118 prevents a flow towards the outlet 524.

Figure 4:
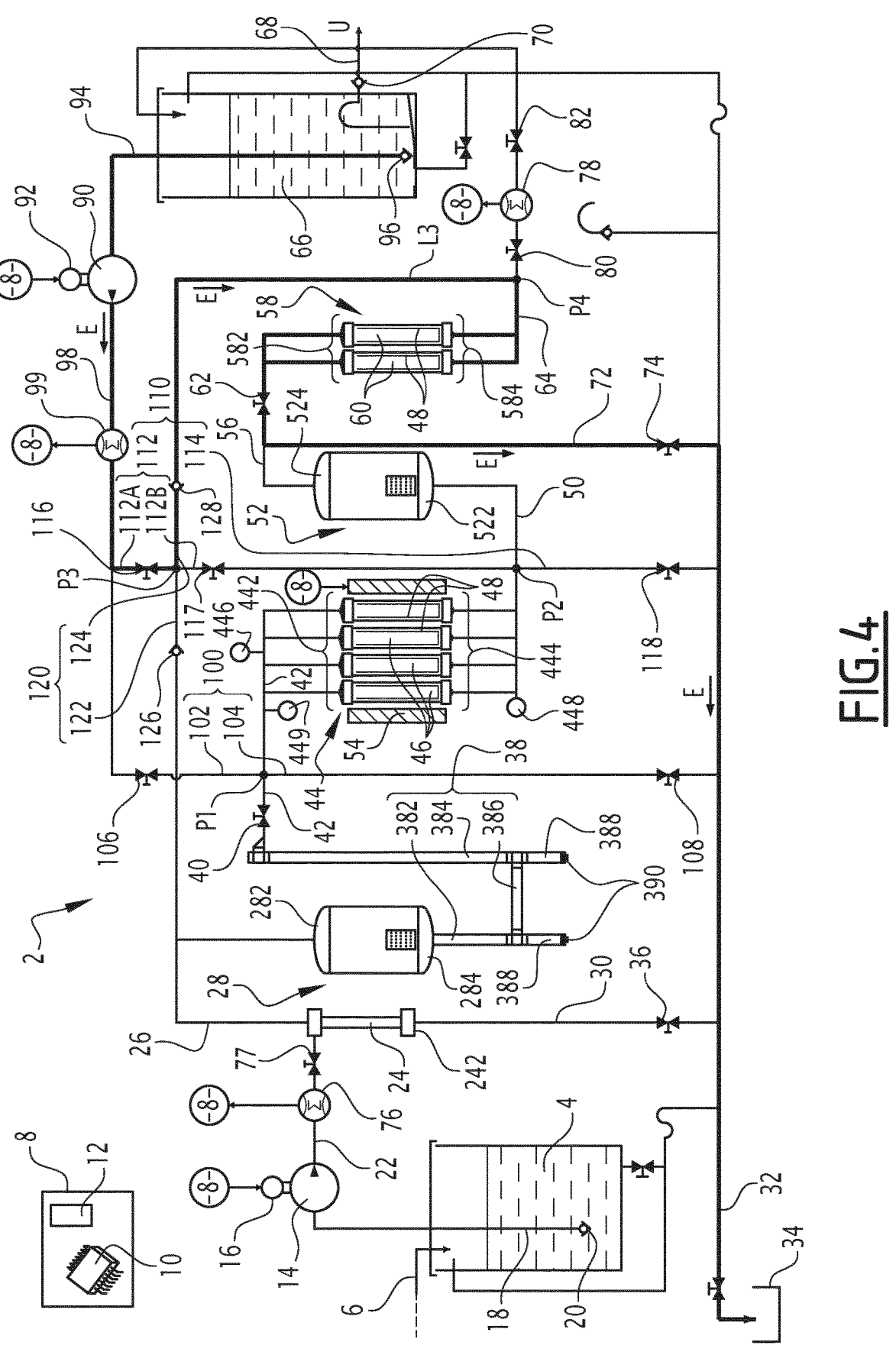
FIG. 4 is the same diagram as in FIG. 1, during a backwash of a third filtration system of the water treatment.

The backwash step is represented in FIG. 4 where the pipes wherein the water actually circulates together form a third backwash line L3 identified by thick lines.

The backwash cycles of the filtration systems 44 and 58 can be carried out in an either coordinated or uncoordinated way, depending on the degree of fouling detected in the ultrafiltration membranes 48, the detection being possible by measuring a head loss or a standardized water flow per unit of time, per unit of surface area, per unit of pressure and at a given temperature. In a variant, the backwashing of the filtration systems 44 and 58 is carried out periodically independently of the head loss or of the standardized flow-rate.

The number of solenoid valves needed for operating the treatment unit 2 in the normal configuration where the water circulates in the circuit C or during the backwash steps, is relatively small. In the example, the treatment unit 2 comprises eleven solenoid valves.

The mechanical effect filtration system 24 serves as a prefilter for the series of four filtration systems 28, 44, 52 and 58. Depending on the quality of the water taken from the tank 4, the filtration system 24 can be omitted. Same is hence optional.

In a variant, the ultrafiltration system 44 or the ultrafiltration system 58 comprises only one ultrafiltration membrane. In such case, the cumulative surface area of one or other of the systems is equal to the surface area of the ultrafiltration membrane thereof.

In a variant, the numbers of ultrafiltration modules of the ultrafiltration systems 44 and 58 are different from 4 and 2 respectively. Same can be 2 and 1, 3 and 1, 5 and 3, 6 and 4, etc. depending on the unit surface area of each ultrafiltration membrane 48 and of the flow-rate of water to be treated in the unit 2.

According to another variant, a heating system of the type of the heating system 54 can be associated with the fourth filtration system 58.

The heating system(s) 54 and/or the equivalent are not necessarily of the electrical resistance type and can, in a variant, consist of annealed copper wire (without oxygen) coupled to resistors or to infrared heating systems made of electrified carbon fiber (heated cloth strips).

According to yet another variant, the activated carbon filter system 52 can be replaced by another filtration system with an adsorbent filtering medium, e.g. zeolite in the form of grains which adsorbs compounds such as uranium.

According to another variant, the filtering medium can consist of metal granules covered with a layer of metal oxide. The granules can be iron granules covered with a layer of manganese oxide. A filter with filter media based on granules treated with manganese dioxide e.g. are used for retaining pollutants dissolved in the water to be treated, such as iron, manganese, arsenic, cadmium, hydrogen sulfide, and for making the water taste-neutral and odor-neutral.

According to yet another variant, the treatment unit 2 can include one or a plurality of additional filtration systems, arranged downstream of the filtration system with filtering media 52, such as an iron oxide filter or an ion exchange resin filter. Preferentially, such additional filtration system(s) are arranged, along the flow circuit C, between the filtration system with filtering media 52, i.e. with activated carbon in the example, and the second ultrafiltration system 58.

An ion exchange resin reduces e.g. ammoniacal nitrogen in water. The ion exchange resin can be of the anionic or cationic, in gel form or in macroporous form.

According to a particular application, if the water to be treated is brackish, or if it is seawater, the treatment unit 2 can be associated with a reverse osmosis or an electrodialysis or even a nano-filtration unit which is installed downstream of the unit 2. A nano-filtration unit is provided for retaining compounds or ions the largest dimension of which is on the order of an Angstrom (A). A nano-filtration unit comprises a membrane or membranes with pores with a size generally comprised between 1 and 7 nm.

The treatment unit 2 can be used for clarification, disinfection and removal of micropollutants from surface water. The clarification is carried out by means of the filtration systems 28 and 44, the disinfection being carried out by means of the filtration systems 44 and 58 and the reduction of the micropollutants is carried out by means of the filtration media system 52. The treatment unit 2 can be used for making water drinkable, for the preparation thereof for use in an industrial method or for the pre-desalination thereof.

The aforementioned contemplated embodiments and variants can be combined for generating new embodiments of the invention.

The invention claimed is:

1. A water treatment unit comprising:
at least one series of four filtration systems, wherein the or each series comprises:
a first filtration system comprising activated glass particles;
a second filtration system comprising an ultrafiltration membrane;
a third filtration system comprising a filtering medium; and
a fourth filtration system comprising an ultrafiltration membrane;
wherein the first, second, third, and fourth filtration systems are arranged in series, in said order, on a flow path of a water being treated in the water treatment unit; and
a fifth filtration system arranged upstream of the series of the four filtration systems, wherein the fifth filtration system comprises a cyclone filter.

2. The water treatment unit according to claim 1, wherein the second filtration system's ultrafiltration membrane has a cumulative surface area, the fourth filtration system's ultrafiltration membrane has a cumulative surface, and the cumulative surface area of the second filtration system's ultrafiltration membrane is greater than the cumulative surface area of the fourth filtration system's ultrafiltration membrane.

3. The water treatment unit according to claim 2, wherein each filtration system comprising an ultrafiltration membrane is formed by a number of identical ultrafiltration modules, and wherein the number of ultrafiltration modules of the second filtration system is greater than the number of ultrafiltration modules of the fourth filtration system.

4. The water treatment unit according to claim 1, wherein the filtering medium of the third filter system is an adsorbent media filter system that comprises activated carbon or zeolite.

5. The water treatment unit according to claim 1, wherein the filtering medium of the third filter system comprises filter media formed of metal granules coated with a layer of metal oxide.

6. The water treatment unit according to claim 1, wherein the water treatment unit comprises a subassembly for individualized backwashing of the second and fourth filtration systems, and, if the fifth filtration system is present, a combined backwashing of the first and fifth filtration systems.

7. The water treatment unit according to claim 6, wherein the backwashing subassembly comprises:

a booster pump for feeding treated water;

a first backwash circuit connecting the outlet of the booster pump to a first point of the flow path that is situated between the first and second filtration systems;

a second backwash circuit connecting the outlet of the booster pump to a second point of the flow path that is situated between the second and third filtration systems and to a third point of the flow path that is situated downstream of the fourth filtration system, wherein the second backwash circuit comprises a branch connected to the second point of the flow path;

a first pilot-controlled valve which controls a flow of treated water in the first backwash circuit;

a second pilot-controlled valve and a third pilot-controlled valve which control the flow of treated water in the second backwash circuit's branch connected to the second point of the flow path;

a fourth pilot-controlled shut-off valve for the flow path downstream of the fourth filtration system;

a fifth pilot-controlled shut-off valve for the flow path between the third and fourth filtration systems; and drain circuits, wherein each drain circuit is equipped with a pilot-controlled shut-off valve and each drain circuit connects the flow path or one of the filtration systems to a collecting pipe.

8. The water treatment unit according to claim 1, wherein the flow path, between the first and second filtration systems, comprises a section equipped with recovery zones for solid particles present in the water being treated.

9. The water treatment unit according to claim 8, wherein the section of the flow path equipped with recovery zones for solid particles present in the water being treated has a cross-section that is wider than cross-sections of the flow path upstream and downstream of the section equipped with recovery zones for solid particles.

10. The water treatment unit according to claim 1 further comprising:

a first meter for measuring a quantity of water circulating in the flow path, wherein the first meter is installed in the flow path upstream of the first filtration system; and a second meter for measuring the quantity of water circulating in the flow path, wherein the second meter is installed in the flow path downstream of the fourth filtration system.

11. The water treatment unit according to claim 1 wherein the glass particles of the first filtration system have a size comprised between 0.4 and 1 mm.

* * * * *